US006284833B1

(12) United States Patent
Ford et al.

(10) Patent No.: US 6,284,833 B1
(45) Date of Patent: *Sep. 4, 2001

(54) OLEFIN POLYMERS WITH IMPROVED PAINTABILITY

(75) Inventors: Aaron K. Ford, Howell, MI (US); William J. Kissel, Alpharetta, GA (US); Chi-Hung Lin, Wheaton, IL (US); Helene G. Lollis, Alpharetta, GA (US); Constantine Metaxas, Alpharetta, GA (US); Mary K. Trost, Alpharetta, GA (US)

(73) Assignee: BP Corporation North America Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/151,944

(22) Filed: Sep. 11, 1998

Related U.S. Application Data

(60) Provisional application No. 60/059,281, filed on Sep. 18, 1997.

(51) Int. Cl.$^7$ ................................ C08J 3/00; C08K 3/20; C08L 9/00; C08L 23/00; B32B 27/08
(52) U.S. Cl. ..................... 524/515; 428/516; 525/232; 525/240
(58) Field of Search .................................. 525/232, 240; 428/516; 524/515

(56) References Cited

U.S. PATENT DOCUMENTS 4,316,966 * 2/1982 Mineshima et al. ................ 525/53

OTHER PUBLICATIONS

L. Dheur, "The Resin Structure of New Polypropylenes: The Key To Well–Designed Automotive Parts," *Polypropylene '97, 6th Annual World Congress*, Zurich, Switzerland (Sep. 15–16, 1997).

R. A. Ryntz and A. McKnight, "The Effect of Molding Conditions on the Adhesion of Coatings to Thermoplastic Olefins (TPOs)," *TPOs in Automotive '96, Third International Conference*, Executive Conference Management, Novi, MI, Oct. 28–30, 1996.

R. A. Ryntz, "Metallocene Impact Modifiers: Influence on TPA Paintability and Cohesive Strength," *TPO's in Automotive '97*, Executive Conference Management, Novi, MI, Oct. 29, 1997.

T. J. Prater, S. L. Kaberlline, J. W. Holubka,, and R. A. Ryntz, "Examination of the Distribution of TPO Adhesion Promoter Material in a Painted TPO System ," *Journal of Coatings Technology*, Jun. 1997.

E. P. Moore, *Polypropylene Handbook*, Hanser/Gardener Publications, Cincinnati, OH, 1996, pp. 211–235.

R. A. Ryntz, The Effect of Thermoplastic Poly(olefin) (TPO) Morphology on Subsequent Paintability and Thermal Shock Performance, *Progress in Organic Coatings*, vol. 27, 1996, pp. 241–254.

R. A. Ryntz, A. C. Ramamurthy, D. J. . Mihora, "Thermal and Impact Induced Stress Failure in Painted TPO: The Role of Surface Morphology," *Meeting of the Federation of Societies for Coatings Technology*, New Orleans, LA, Oct. 1994.

R. A. Ryntz et al., "Friction Induced Paint Damage As Affected By Clearcoat Chemistry," *Waterborne, High Solids, and Powder Symposium*, Feb. 5–7, 1997.

* cited by examiner

Primary Examiner—Patrick D. Niland
(74) Attorney, Agent, or Firm—Wallace L. Oliver

(57) ABSTRACT

Injection moldable thermoplastic polyolefin resins containing from about 20 to about 40 wt % EPR dispersed in a continuous highly isotactic polypropylene having good paintability. Reactor prepared resins, or RTPO resins, containing highly isotactic polypropylene and from 20 to 30 wt % of an EPR component comprising from about 40 to about 55 wt % ethylene are particularly attractive for use in the production of automotive trim and fascia.

20 Claims, 2 Drawing Sheets

OLEFIN POLYMERS WITH IMPROVED PAINTABILITY

CROSS REFERENCE TO RELATED APPLICATIONS

This application claims benefit of U.S. Provisional Application No. 60/059,281 filed Sep. 18, 1997, which is incorporated by reference herein.

BACKGROUND OF THE INVENTION

This invention relates to polyolefins, and more particularly to polyolefin compositions having improved paintability. Still more particularly, the polyolefin compositions of this invention comprise a highly isotactic polypropylene having an olefin rubber component dispersed therein. Injection molded articles comprising the invented compositions are characterized by good paint adhesion, a layered morphology in the shear zone nearest the surface, and an excellent balance of mechanical properties including stiffness.

Polypropylene has found wide acceptance for use in a great variety of applications for its ease of molding, good heat resistance and mechanical properties. Resin formulations based on polypropylene may be tailored to meet the demands imposed by a variety of structural and decorative uses in the production of molded parts for appliances, household goods and autos. Impact modified polypropylene and elastomeric ethylene-propylene copolymers have found application in automotive applications including interior trim as well as in exterior parts such as bumper fascia, grill components, rocker panels and the like. Polypropylene resins have the thermal and chemical resistance to withstand exposure to the wide variety of environments encountered in automotive uses, and are easily molded at a cost far below that of metal stamping to provide parts that will not rust or corrode and are impact resistant, even at low temperature.

However, polyolefins are generally known to have poor paintability characteristics. Adhesion of paints, coatings and adhesives to the surfaces of parts molded from these nonpolar, crystalline or semicrystalline resins is generally considered to be very poor, and further treatment or modification is needed for parts to be acceptable for most uses requiring paintability. Considerable research has been directed to developing chemical and physical methods for overcoming this deficiency. Etching, chemical oxidation, treating with polar chemical primers, and the like have been employed for modifying the surface properties. Activation of molded part surfaces through treatment with flame, arc or plasma spray techniques has also been employed for these purposes, and additives to improve paint adhesion to polyolefins have been disclosed in the art.

For the purposes of this invention, the term paintability will be understood to mean the adhesion or lack of adhesion of paints to the surface of a molded plastic article. There are a variety of test methods, both non-standardized and standardized, for determining paintability of plastics. The particular test employed by an industry or a segment of an industry will be selected to measure paint adhesion under practical conditions related to the intended use. In the automotive industry, for example, tests are developed by individual manufacturers to determine adhesion under a variety of field conditions including water immersion, erosion and abrasion by gravel, and stone impact. In these discussions, paintability comparisons will be understood to be based on the same test methods and for panels coated with the same paint or coating materials.

The relationship between paintability and morphology in molded articles comprising blends of polypropylene compounded with impact modifying elastomers has long been the subject of intensive investigation. Generally, rubber-modified polypropylenes are heterogeneous blends and may be further described as comprising a continuous polypropylene matrix phase having a discontinuous rubber phase in the form of particles dispersed therein. When these heterogeneous blends are injection molded shear forces are developed within the molten resin, the stress levels within the molten resin being dependent upon flow rate and melt viscosity, and varying with proximity to the part surface. A cross section of the molded part, when examined microscopically, may be seen to have a shear zone nearest the surface where the dispersed rubber particles are oriented along the lines of flow and distorted by the flow to have a high aspect ratio. Rubber particles in the bulk or core of the molded part, that portion furthest from the surface, are subjected to lower shear forces and are thus more randomly distributed and tend to be less elongated. Cooling rates within the molded part, slower in the core zone, tend to allow elongated particles in the bulk material to relax and become more spherical in shape. A morphology gradient may be seen in the distribution of the rubber particles in the shear zone, with the oriented rubber phase particles diminishing and becoming more random with distance from the part surface. A distinct layered morphology may be developed along the flow lines. The morphology of the shear zone is believed to have significant effect on surface characteristics, including paintability.

In discussing the relationships between part morphology and paintability, the morphology being referenced and discussed will be understood to be the morphology of the shear zone for an injection molded article, including the surface layer and extending into the bulk or core. The concepts will be well understood by those skilled in the art, and are disclosed and fully described in the art including in the "Polypropylene Handbook" Hanser Publications, NY, 1996, and in the many papers cited therein.

At the surface of the molded article there may be found a layer consisting substantially of crystalline polypropylene (PP). This surface layer or skin, also found for moldings from homopolypropylene, is important to part appearance and surface hardness. The thickness and crystallinity of the PP surface layer that forms depends in part upon molding conditions including mold temperatures and cooling rates, and upon annealing. Where the layer is thick and highly crystalline the part may delaminate when later subjected to impact or to other stress, particularly in the shear direction.

The skin layer may also affect paintability of rubber modified PP resins. The presence of a thick and highly crystalline PP surface layer is disclosed in the art to hinder access of the paint components to the rubber component that lies directly beneath the surface, thereby preventing good adhesion.

Rubber-modified polyolefins with higher levels of rubber modifier are also widely known. These resins, frequently termed thermoplastic polyolefin (TPO) resins, will for the purposes of this invention be generally considered to be rubber modified polyolefins containing greater than about 20 wt % of the rubber component. The morphology of molded thermoplastic polyolefins has been summarized and is well described in the art, particularly in Organic Coatings 27 (1996) pp. 241–254; the teachings of this reference are incorporated herein in their entirety by reference.

Morphology is believed by those skilled in the art to similarly affect the paintability of TPO resins. Articles molded from compositions comprising the higher levels of rubber found in TPO resins tend to form more highly layered structures, with crystalline and immiscible or poorly miscible components. These layered structures are more likely to undergo cohesive failure within the matrix, and the interface between the crystalline PP forming the surface layer and the rubber modified layer immediately below the surface may be particularly susceptible to immiscibility. Thick, highly crystalline PP surface layers will thus be particularly subject to such failure, with shearing impact resulting in delamination of the surface layer. Resistance to stone impact, a highly important property for automotive exterior parts, is disclosed in the art to be highly dependent on resistance of the surface layer to cohesive failure.

Good dispersion of the rubber component in the homopolymer matrix is important to mechanical properties as well as to melt rheology and thereby to the morphology of molded articles. Compounding processes are widely used to disperse the rubber component into the PP matrix, and methods for achieving adequate dispersion are well developed. The size of the rubber particles will be controlled by molecular weight of the rubber component which in turn is a direct function of the polymer viscosity. The effect of viscosity ratio—the ratio of rubber viscosity to matrix viscosity—on rubber dispersion and morphology is well documented in the art. Increasing the viscosity ratio has been disclosed to increase particle size for blends, while a lowered ratio tends to result in an increase in the aspect ratio for the rubber particles and in a greater degree of rubber phase orientation near the surface. Proper selection of viscosity ratio has also been disclosed in the art to reduce or prevent agglomeration of rubber particles during processing, particularly for reactor-generated, rubber modified polypropylenes.

More recently, in-reactor methods have been developed for producing high rubber content thermoplastic polyolefins akin to the TPO blends. The rubber component of thermoplastic polyolefin resins produced by these processes, termed RTPO resins, is finely and uniformly dispersed in the PP matrix and without need for subjecting the resins to a compounding operation. In-reactor polymerization processes also afford good control of the rubber component composition, and of the molecular weight for the initial homopolymer and the final resin product. The processes permit the resin producer to tailor the overall balance of stiffness, hardness, impact resistance, and tensile strength properties for RTPO resins to meet the specific requirements of a wide range of applications.

Good surface properties including paintability are a further requirement of resins intended for use in the production of appearance parts and in trim and decorative uses, particularly in automotive applications. TPO resins having the desired paintability are difficult to produce reliably, and none are presently available with the desired combination of stiffness, paintability and durability needed for automotive uses. RTPO resins having acceptable paintability over a wider range of stiffness and rigidity, together with good durability in use of the painted articles are needed and such materials would readily find wide acceptance in the molding arts. A method for reliably producing such resins would provide a widened range of materials particularly suited for use in exterior and interior trim and in appearance parts where painting is contemplated and would be an important advance in the art.

BRIEF SUMMARY OF THE INVENTION

The invention pertains to an in-reactor thermoplastic polyolefin (RTPO) resin and to articles molded therefrom having improved paintability. More particularly, the invention relates to RTPO resins comprising a highly isotactic polypropylene matrix having dispersed therein a rubber component comprising ethylene/propylene copolymers and to molded articles comprising such resins having a layered matrix/rubber particle morphology in the shear zone. Still more particularly, the RTPO resin compositions of this invention will contain a matrix phase comprising from about 80 to about 60 wt % isotactic polypropylene having dispersed therein from 20 to about 40 wt % of a particulate rubber phase, said rubber phase comprising copolymerized ethylene and propylene copolymer containing from about 40 to about 60 wt % ethylene units.

RTPO resin compositions according to the invention, when molded, will afford parts having good paintability and the layered morphology understood in the art to be characteristic of paintable polypropylene, while retaining a good balance of mechanical properties including stiffness and toughness. The invention thus may also be characterized as a method for providing molded articles comprising RTPO resins having improved paintability and RTPO compositions therefor.

DETAILED DESCRIPTION OF THE INVENTION

Figure 1:
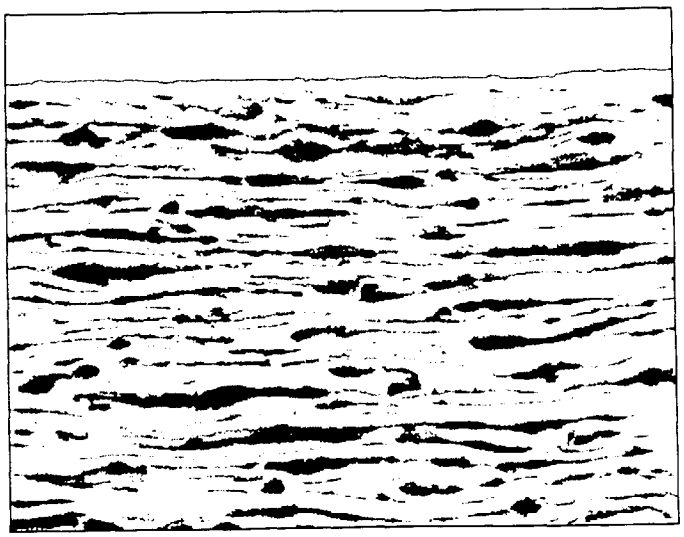
FIG. 1 is a drawing of a cross-section taken normal to a surface of a molded article of an embodiment according to the invention as set forth in Example 25, taken normal to a surface and showing the morphology of the article in the shear zone near the surface.

Rubber modified polyolefin resins containing greater than about 20 wt % of the rubber component are well known and described in the art and are generally called thermoplastic polyolefin resins or TPO resins. Most commercially important TPO resins are blends prepared by combining two or more pre-formed polymers in a melt blending or compounding operation. Prior art TPO resin blends include binary blends of polypropylene (PP) with an ethylene-propylene rubber (EPR) or ethylene-propylene-diene monomer terpolymer (EPDM), as well as ternary blends of these materials with polyethylene (PE). Additional $C_4$–$C_{14}$ olefin monomers, both linear and branched, are disclosed in the art for use in producing a further variety of rubber modified polypropylene resins. For example, 1-butene, 1-hexene, 4-methyl-1-pentene, 1-dodecene and the like have been employed in the polypropylene art for purposes of modifying crystallinity, mechanical properties including stiffness, and thermal properties including heat deflection temperature.

Thermoplastic polyolefin resins according to the invention are those designated in the art as in-reactor TPO resins or RTPO resins, and may be further characterized as TPO resins prepared directly in a reactor by a polymerization process. The resins preferred for the purposes of this invention, particularly when intended for use in producing molded articles having good paintability, will be RTPO resins comprising propylene and ethylene monomers copolymerized, preferably in a sequential process, to form an isotactic PP matrix having a particulate EPR dispersed therein. Although RTPO resins according to the invention may made with the same general compositions as set forth above for resin blends, those skilled in the art will recognize that the use of additional monomers may affect the morphology of the molded articles and their paintability characteristics to different extents and thus will require further evaluation in their selection and use.

The preferred RTPO resins according to this invention may be further described as comprising up to about 80 wt % isotactic homopolypropylene together with at least about 20 wt % ethylene-propylene copolymer (rubber component), based on combined weight of olefinic polymer components, and more preferably will comprise from about 80 to about 60 wt % isotactic homopolypropylene and from about 20 to about 40 wt % rubber component. Still more preferably the RTPO resin will comprise from about 75 to about 65 wt % highly isotactic polypropylene and from about 25 to about 35 wt % rubber component, based on the combined weight of the two polyolefin components.

The isotactic or crystalline propylene polymer component of the RTPO will contain crystalline domains interspersed with some non-crystalline domains. Noncrystallinity can be due to defects in the regular isotactic polymer chain which prevent perfect polymer crystal formation. The extent of polypropylene stereoregularity in a polymer can be measured by well-known techniques such as isotactic index, crystalline melting temperature, flexural modulus, and, recently by determining the relative percent of meso pentads (% m4) by carbon-13 nuclear magnetic resonance ($^{13}$C NMR). The high crystalline polypropylene component of RTPO resins according to the invention will preferably have an NMR tacticity index greater than 90, preferably greater than about 92, and still more preferably in a range of about 92 to about 97. Still higher tacticity index polypropylenes, to as great as 100, will be found useful. For comparison, general purpose propylene polymers typically have a NMR tacticity index up to about 92, while highly crystalline propylene polymers having NMR tacticity indices above about 94 have more recently become available. The isotactic polypropylene component of the invented RTPO resins will typically have a melt flow rate (MFR) of about 1 to about 100 g/10 min., preferably about 1 to about 20 g/10 min.

The EPR copolymer or rubber component of the RTPO resins according to the invention will comprise from about 40 to about 60 wt % ethylene, more preferably from about 40 to about 55 wt % ethylene units, and still more preferably from about 40 to about 50 wt % ethylene units, copolymerized with propylene and forming an ethylene-propylene (EPR) copolymer. Compositions comprising an EPR component having from about 43 to about 55 wt % ethylene units may be found to be particularly preferred for many applications. EPR copolymers containing less than about 40% ethylene generally are known to have poor elasticity at low temperatures, and thus may provide RTPO resins that are too rigid and lack the balance of mechanical properties over a wide temperature range needed for most automotive applications. At high levels of ethylene, generally above about 60 wt % ethylene units, separate crystalline ethylene domains may form within the rubber component, and interphase adhesion and miscibility are reduced. Compositions containing ethylene at levels outside the specified ranges as set forth will thus not be preferred.

Reactor-prepared rubber-modified PP resins comprising EPR having an appropriate amount of ethylene units as set forth herein but containing less than about 20 wt % to as low as 15 wt % of the rubber component may find utility in a variety of molding and extrusion applications, including applications where improvement in paintability may be important. RTPO resins with still lower levels of rubber generally will be more rigid and lack flexibility and may thus be poorly suited for use in automotive trim and fascia and in similar applications. As is known in the art, the presence of the rubber component at high levels above about 60 wt % tends to severely lower stiffness and lower tensile strength. While these soft materials may find some utility, they generally lack the balance of tensile properties and stiffness needed for use in automotive applications and particularly in panels, fascia and trim. Moreover, at levels above or near 70 vol. % the rubber component may fail to form dispersed particles and instead become the continuous phase, or form a co-continuous phase with the polypropylene component. Compositions comprising rubber component at levels outside the specified ranges as set forth are therefore not preferred.

Adhesion of paints and coatings to the surfaces of molded plastic articles has been characterized in the art as a surface property related to the morphology of the material surface. The morphology of compounded TPO resins, i.e. those produced by mechanically blending separately produced matrix and rubber components has been investigated and the relationship of morphology to paintability for such materials is described in the art. While not wishing to be bound by a particular theory or explanation, it appears that the present knowledge and understanding of those skilled in the art is that the morphology and thereby the paintability of TPO resins produced by compounding is markedly influenced by the ratio between the viscosity for the rubber component and the viscosity for the homopolymer component, termed the viscosity ratio. A highly oriented rubber phase will be observed to develop near the surface or skin layer for compounded blends having a low viscosity ratio, increasing the surface area of the dispersed phase which is said to favor improved coating adhesion and paintability. At a higher viscosity ratio the morphology will be more isotropic, reducing the adhesive strength of the coating layer. By viscosity is meant the inherent viscosity of the resin, which those skilled in the art will understand to be a direct function of polymer molecular weight.

Surprisingly, for RTPO resins according to this invention, morphology and paintability are relatively little affected by viscosity ratio. Unlike for the prior art compounded TPO resins, the primary factor in obtaining correct shear zone morphology for good paintability in the RTPO resins of this invention is the ethylene content of the rubber component. That is, the morphology within the shear zone for articles molded from RTPO resins, and the paintability of such articles, will be determined mainly by the level of ethylene in the rubber component.

The balance of mechanical properties including rigidity and stiffness of the molded article may be varied as needed to meet requirements for a particular application by selection of the rubber content and the ethylene content of the rubber, according to the teachings contained herein. For applications requiring increased stiffness, particularly desirable where the use of thinner-walled parts to reduce both weight and cost is contemplated, an RTPO resin with a low rubber content will be selected, and where soft and more flexible materials are desired a resin having a higher rubber level will be selected. Acceptable paintability performance over a wide range of stiffness may be accomplished by modifying the ethylene content within the specified ranges. A higher level of ethylene, generally at or above about 50 wt %, may be required to obtain the molded part morphology needed for good paintability in RTPO resins when using higher levels of rubber, above about 35 wt %, to reduce flexural modulus. However, at high rubber levels some surface roughness and development of gel particles may be observed in the molded part, and balancing ethylene content and rubber level thus will require care.

RTPO resins may be prepared by a variety of methods described in the art. Methods are disclosed in the art for the in-reactor preparation of impact PP resins, many of which will contain the same monomer components though at a lower level of rubber, and a variety of such well-described processes have been employed for the commercial preparation of such impact PP resins.

Gas-phase reactor processes known in the art include those based on continuously stirred tank reactor and fluid bed technologies. Examples of such reactor systems are described in U.S. Pat. Nos. 3,957,448; 3,965,083; 3,971, 786; 3,970,611; 4,129,701; 4,101,289; 3,652,527; and 4,003, 712, all incorporated by reference herein. Typical gas-phase olefin polymerization or copolymerization reactor systems comprise at least one reactor vessel to which olefin monomer and catalyst components can be added and which contain an agitated bed of forming polymer particles. Typically, catalyst components are added together or separately through one or more valve-controlled ports in the single or first reactor vessel. Olefin monomer, typically, is provided to the reactor through a recycle gas system in which unreacted monomer removed as off-gas and fresh feed monomer are mixed and injected into the reactor vessel. Polymerization or copolymerization will be carried out under conditions that exclude oxygen, water, and other materials that act as catalyst poisons, and may be carried out in the presence of additives to control polymer or copolymer molecular weights. Hydrogen is typically employed for this purpose in a manner well known to persons of skill in the art. Although not usually required, upon completion of polymerization or copolymerization, or when it is desired to moderate or terminate polymerization or copolymerization or at least temporarily deactivate the catalyst or catalyst component of this invention, the catalyst can be contacted with water, alcohols, carbon dioxide, oxygen, acetone, or other suitable catalyst deactivators in a manner known to persons of skill in the art.

The current practice in the trade employs such processes for the most part to separately produce homopolymer and copolymer resins, which then are post-blended in a compounding operation to provide rubber modified polypropylene resins.

For in-reactor production of impact copolymers, homopolymer formed from the first monomer in a first reactor will be reacted with the second monomer in a second reactor. For example, the gas phase reactor processes such as are described in Hydrocarbon Processing 74 pp. 140–142 are disclosed to be useful for the production of impact PP resins. The two stage horizontal gas phase reactor described in Polyolefins VI SPE RETEC, Houston, Tex. (1991), page 68 has also been employed in the production of impact polypropylene and may be particularly well suited for the production of paintable RTPO resins according to this invention. The latter process has been further described for use in the manufacture of copolyolefins in Petrochemical Review, March, 1993. Processes described in U.S. Pat. No. 3,957,448 and in Chemical Engineering Science Vol. 47, no. 9–11 (1992) pp. 2591–2596 may also be found useful. Such polymerization processes are generally also suitable for the preparation of RTPO resins.

Sequential polymerization processes do not appear to have been heretofore employed for the direct preparation of the higher rubber content RTPO resins set forth and described herein.

Resins initially produced in the aforesaid processes are generally in powder form and have a low melt flow rate (MFR). For RTPO resins the MFR for the as-produced powder may be as low as 0.5 gl/10 min., determined according to ASTM 1238 Condition L. Though such resins can be extruded, they are moldable only with difficulty, and will thus require additional processing to increase the MFR and provide resins suitable for fabrication in commercial injection molding equipment. Conventionally, the MFR of as-produced rubber modified PP resins will be modified in a secondary treatment with peroxide, using controlled rheology techniques. These processes may be employed with RTPO resins according to the invention to provide a molding grade resin having an MFR in the range of from about 2 to about 40 g/10 min. or higher. Preferably the MFR of RTPO resins according to the invention will be in the range of from about 10 to about 30 g/10 min., and more preferably from about 10 to about 20 g/10 min. The resin generally will be pelletized in a strand extrusion operation using a compounding extruder to provide strand, and then chopping the strand to provide pellets for convenient handling in further fabrication processes.

The morphology of an RTPO powder produced by gas-phase processes is unique, the rubber phase being well-dispersed within the polypropylene matrix and extending uniformly throughout the powder. Even after pelletizing the rubber component remains in a highly dispersed form, providing a resin morphology quite unlike the morphology of blends produced by combining separately produced matrix and rubber components in a compounding operation.

RTPO compositions according to this invention may be pelletized and compounded using any of the variety of compounding and blending methods wellknown and commonly used in the resin compounding arts. Conveniently, the resin will be combined with such stabilizers and further additives and modifying components as desired, whether in powder, pellet, or other suitable form, mixed and melt compounded using a high shear mixer, e.g., a twin-screw extruder at temperatures effective to render the resinous components molten, to obtain a desirably uniform blend. The components may first be combined in solid form prior to melt compounding to facilitate mixing. Particulates, fibers and other additives may be incorporated into one or more of the components prior to combining with the remaining components, or the components may be physically mixed in powder or pellet form using conventional dry-blending methods and then extrusion compounded. Plasticating the resin in a compounding extruder and feeding the additives, particulates or fibers to the molten composition through a port in the extruder, as is also commonly practiced in the art, may be found useful in compounding the compositions of this invention.

Molding resin formulations comprising the invented RTPO resins may further comprise from 5 to as much as 60 wt. % or more of one or more particulate or fibrous reinforcing fillers such as glass fiber or carbon fiber, graphite, carbon black or the like, or fillers such as clay, talc and mineral fillers and the like commonly employed in the trade for the manufacture of molded articles and extruded goods. Stabilizers, antioxidants, lubricants, colorants and the like may also be employed in amounts and using processes and procedures as commonly practiced in the resin compounding arts. RTPO resins according to the invention may also find further application as the major or minor component of blends comprising compatible or immiscible thermoplastic resins, and may be combined with suitable thermosetting or crosslinkable resins for use in providing a variety of curable and vulcanizable blend compositions.

The invented RTPO resins may be injection molded or fabricated forms using any of a variety of processes and methods well-known and widely practiced in the fabricating arts, including melt extrusion of sheet, film, tubing, profile and the like, to provide a wide variety of physical shapes and forms. When used as films or when made into molded or extruded products, these blends, including filled and laminated products prepared therefrom, not only possess good physical properties and excellent chemical resistance at room temperature, but they retain their strength and good performance over a wide range of temperatures and for long periods of time. Films and molded articles comprising the RTPO resins of this invention may be particularly useful in automotive exterior and interior trim parts and in electrical applications where resistance to solvents, mechanical fluids and coatings solvents may be important, in durable goods and appliances, in medical and plumbing applications where resistance to hot, humid environments may be particularly important, and in safety equipment and protective gear.

The invention will be better understood by way of consideration of the following illustrative examples and comparison examples, which are provided by way of illustration and not in limitation thereof. In the examples, all parts and percentages are by weight unless otherwise specified.

EXAMPLES

The RTPO resins employed in the following examples were prepared using the Amoco Gas Phase Process. The process as disclosed and well described in the art may be characterized generally as being conducted using two horizontal, stirred-bed, gas phase reactors in series. The plug-flow reactors employ an interlock system separating the first stage homopolymer reactor from the second stage copolymer reactor. The process provides an inherently narrow residence time distribution coupled with optimized stirring, minimizing temperature variations and resulting in greater product consistency. In the production of RTPO resins, a uniform homopolypropylene matrix is created in the first reactor, and passed to the second stage reactor where the ethylene propylene copolymer rubber is created, providing a uniform dispersion of the copolymer rubber in the matrix without the requirement for postblending.

The Amoco process is disclosed generally in "Polypropylene Handbook" pp. 297–298, Hanser Publications, NY (1996), and is more fully described in U.S. Pat. No. 3,957,448 and in "Simplified Gas-Phase Polypropylene Process Technology" presented in Petrochemical Review March, 1993. The teachings of these publications and the patent are hereby incorporated herein in their entirety by reference. The process employed for the production of the RTPO polymers employed herein substantially followed the teachings set forth in "in "Simplified Gas-Phase Polypropylene Process Technology" for the production of impact PP resins, using higher levels of ethylene and rubber as set forth herein.

RTPO resins were initially obtained in powder form. The MFR rate of the as-produced resin powder was increased using peroxide in a controlled rheology process. The resins, together with lubricant (calcium stearate, 0.03 wt %), phosphite stabilizer (phenol, 2,4-bis(1,1-Dimethylethyl)-, phosphite, 0.1 wt %) and antioxidant (2,2-bis[[3-[3,5-bis(1,1-dimethylethyl)-4-hydroxyphenyl]-1-oxopropoxy] methyl]-1,3-propanediyl ester, 0.05 wt %), were then pelletized by feeding the blend to a Werner Pfleiderer twin screw extruder. The polymer was extruded through a strand die, cooled and chopped to form pellets.

Sample Preparation

The blends were injection molded to provide 0.125 in thick, 4 in×12 in plaques, using a Stokes screw injection molding machine, operated at a screw speed of 70 rpm and using barrel temperatures of 415–425° C. and a nozzle temperature of 430° C. Mold temperature was 80° C.

For paintability testing and evaluation the test panels were painted following the standardized procedures in GM 4388M—"Exterior Paint Performance Requirements". Generally described, the molded plaques were first cleaned, then coated by spray painting with a formulated solution of HVLP chlorinated polyethylene adhesion promoter, obtained from Morton Automotive Coatings as HP21054-4B1. The plaques were given 2 wet coats of adhesion promoter, giving a dried coating nominal thickness of 5 microns. The paint system selected for testing in the following examples was a 2 coat system, including a one-component (1K) color coat obtained from DuPont as 872AB839 (white) or 871DF938 (blue) to a nominal dry film thickness of 30 microns (white) or 20 microns (blue) followed by a 1K clear top coat, obtained from DuPont as RK7017. The panels were dried in a gas fired circulating air oven to a part temperature of 250° C. for 30 min., giving a nominal final dry film thickness of 48 microns (white) or 46 microns (blue), measured according to ASTM D1186.

Test Methods

Flexural Modulus was determined according to ASTM D790, using a speed of 0.5 in/min.

Melt Flow Rate (MFR) was determined by ASTM D1238, Condition L (230° C., 2.16 Kg load. Those skilled in the art will recognize that for RTPO resins, MFR can be directly measured only for the first stage resin component, normally the matrix resin, and for the final product. Melt Flow Rate for the rubber copolymer component, needed to determine MFR ratio, may only be obtained by calculation. For the following Examples, MFR is reported for the PP homopolymer and for the final product as obtained. The MFR ratio, based on the calculated MFR for the rubber component, is also supplied for reference.

Paintability Rating

Painted test plaques were evaluated for water resistance and gasoline resistance, and for hot abrasion resistance. The weighted average of panel performance in the three tests, together with visual rating, given on a subjective basis, were used to provide an overall performance rating.

Water resistance was determined according to the General Motors Engineering Standards GM4465P "Water Fog Humidity Test". The test may be generally described as placing the painted test plaque in an environmental chamber at 100% relative humidity and 100° F. (38° C.) for 96 hours. The painted surface is then subjected to peel testing.

Gas Soak testing was carried out by placing the plaque in a mixture of toluene and VM&P naphtha (45/55 volume ratio) for 30 min. The panels were removed, visually inspected for paint loss, then air dried for 4 hr. The painted surface was then subjected to peel testing.

Peel testing was carried out using the standard tape test, generally described as applying a pressure sensitive glass tape to a scored painted surface, then removing the tape and noting the amount of paint loss. Published methods for this test include ASTM D3759 and General Motors Engineering Standards GM9071P. Peel test results were recorded as pass or fail using GM standards.

Abrasion testing was carried out following the General Motors Engineering Standards GM1000M "Scuff Resistance Test", employing a Tabor Abraser to determine paint removal from a painted surface of a heated test specimen. The panels are heated for 60 min. in a circulating air oven at a temperature of 85° C., then place on the rotating table and contacted with a probe weighted to 454 g for 100 rotations. The performance is determined by measuring the arcs in the surface caused by the probe and reporting sum loss of paint in percent (%).

Examples 1–15

The following Examples 1–15 are embodiments of RTPO resins according to tion, wherein injection molded test specimens, coated with a 1K paint system as set forth above, are tested for paint adhesion. The compositions of the RTPO resins of Examples 1–15, together with Melt Flow characteristics and the Painting ratings for the molded test specimens, are summarized in the following Table 1. In all of the examples, the rubber content is given in weight percent (wt %) based on combined weight of polypropylene matrix and rubber component. The ethylene content of the rubber component ($RCC_2$) is given in wt %, based on combined weight of olefin monomers forming the rubber component.

$RCC_2$, tend to provide moldings with acceptable paintability only at higher levels of rubber. Compare Examples 4–6, showing that an increase in rubber content from 31% in Example 4 to 45% in Example 6 significantly improves the paintability characteristics for a composition with a nominal $RCC_2$ level of 55 wt % ethylene. Note also Examples 1–3, where articles molded from compositions with a 30 wt % rubber level gives inconsistent paintability performance at higher levels of ethylene monomer. The difficulties in molding articles with good paintability for compositions having greater than 50 wt % ethylene will be particularly apparent from a comparison of Examples 7 and 8.

The effect of rubber content on stiffness is demonstrated by the decrease in Flexural Modulus produced by increasing the rubber content. Good paintability may be obtained over a wide range of Flexural Modulus values. However, from a comparison of Examples 2 and 15 it will be seen that for RTPO resins having the same nominal level of rubber, greater stiffness may be attained by increasing the $RCC_2$ content, but paintability will be detrimentally affected.

As will be further described herein below, the conditions employed in molding can affect the morphology of the molded article. From the paintability results, it will be apparent that compositions having high levels of ethylene monomer may be more difficult to mold correctly. Both acceptable and non-acceptable paintability results may thus be obtained for moldings from such compositions.

The morphology characteristics for good paint adhesion to the surfaces of molded TPO resin has been identified. While the morphologies for as-produced-powder and for pelletized forms of the RTPO resins of this invention are said to be unique, the shear zone and the surface morphologies of injection molded RTPO articles with good paintability have the same general appearance as is observed for paintable injection molded articles made from blended TPO resins.

TABLE 1

Composition vs Paintability

| Example | Rubber (wt %) | $RCC_2$ (wt %) | MFR Final (g/10 min) | MFR PP (g/10 min) | MFR ratio | Paintability rating | numeric | Flex Modulus (Kpsi) |
|---|---|---|---|---|---|---|---|---|
| 1 | 29.4 | 58.1 | 1.3 | 4.6 | 71 | marginal | 3.0 | 134 |
| 2 | 30.7 | 56.4 | 1.6 | 7.7 | 170 | bad | 2.0 | 137 |
| 3 | 30.7 | 55.7 | 1.7 | 11.6 | 521 | marginal | 3.0 | 136 |
| 4 | 31.2 | 54.8 | 1.4 | 16.2 | 2200 | V bad | 1.0 | 138 |
| 5 | 44.9 | 54.4 | 1.3 | 11.6 | 131 | good | 4.0 | 87 |
| 6 | 38.7 | 55.1 | 1.2 | 7.9 | 133 | good | 4.0 | 98 |
| 7 | 35.0 | 53.2 | 1.7 | 9.7 | 147 | bad | 2.0 | 110 |
| 8 | 37.0 | 52.4 | 1.3 | 8.5 | 158 | good | 4.0 | 111 |
| 9 | 48.7 | 49.3 | 1.3 | 13.9 | 130 | good | 3.0 | 84 |
| 10 | 32.0 | 48.8 | 1.5 | 5.3 | 53 | good | 4.0 | 115 |
| 11 | 35.4 | 48.3 | 1.4 | 5.8 | 60 | good | 5.0 | 101 |
| 12 | 34.4 | 48.0 | 1.6 | 12.7 | 310 | good | 4.0 | 108 |
| 13 | 48.2 | 47.5 | 1.4 | 14.7 | 131 | VG-Exc | 5.0 | 87 |
| 14 | 38.2 | 45.3 | 1.6 | 15.0 | 351 | V good | 5.0 | 100 |
| 14 | 30.8 | 44.2 | 1.8 | 14.9 | 962 | good | 4.0 | 121 |

Examples 1–15, summarized in Table 1, include embodiments according to the invention together with embodiments offered for comparison purposes. It will be apparent from a consideration of the examples that compositions comprising a rubber component having an ethylene content $RCC_2$ below about 50 wt %, shown in Examples 9–15, provide moldings having consistently good paintability ratings. Compositions having higher levels of ethylene, those above about 50 wt % However, the parameters important for controlling paintability and morphology in RTPO resins will be seen to be surprisingly different.

Examples 16–25

In the following Examples 16–25, including embodiments according to the invention together with embodiments offered for comparison purposes, the effect of the three variables, rubber content, ethylene content of the rubber and melt flow rate ratio, on morphology in molded articles are compared. The injection molded specimens were sectioned through the thickness and normally to the surface, providing a cross section of the panel. The surface of the mounted sample, etched with chromic acid at 72 degrees C to remove the rubber, was examined by SEM at 2 kV and at a working distance of 10 mm.

Figure 2:
FIG. 2 is a drawing of a cross-section taken normal to a surface of a molded article of an embodiment according to the invention as set forth in Example 21, taken normal to a surface and showing the morphology of the article in the shear zone near the surface.
Figure 3:
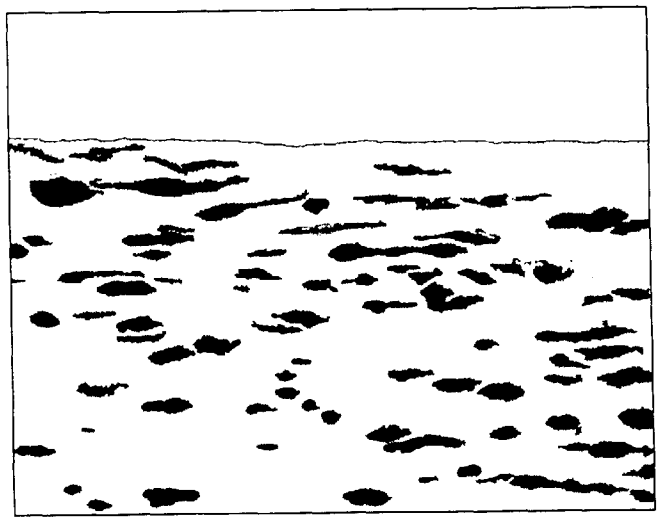
FIG. 3 is a drawing of a cross-section taken normal to a surface of a molded article not according to the invention as set forth in Example 18, a comparative example, showing the morphology of the article in the shear zone near the surface.
Figure 4:
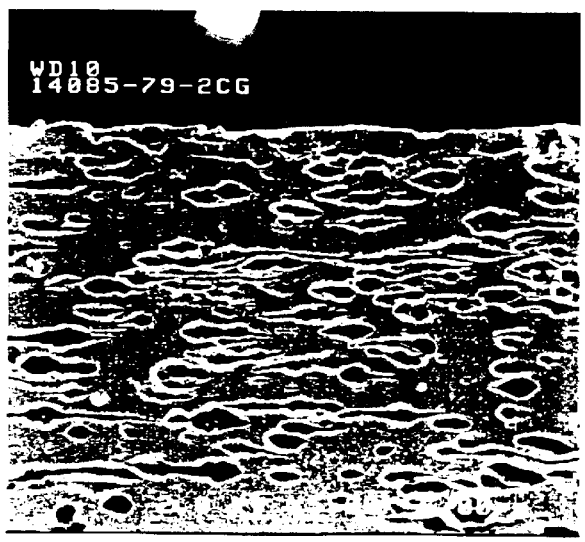
FIG. 4 is a photomicrograph of the cross-section of the molded article shown in the drawing, FIG. 1, taken at 5000X by scanning electron microscopy.
Figure 5:
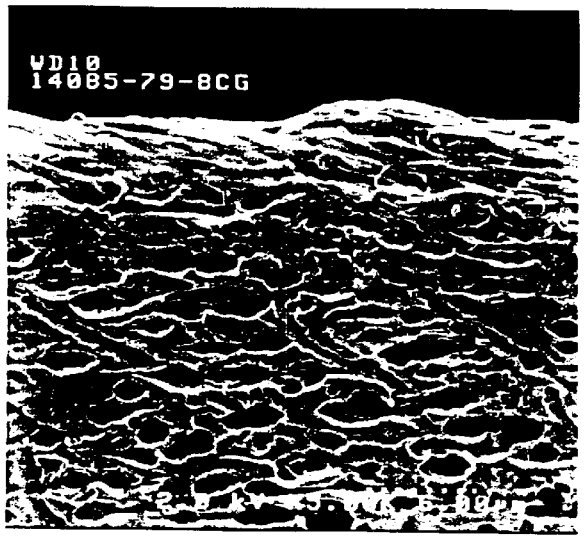
FIG. 5 is a photomicrograph of the cross-section of a molded article shown in the drawing, FIG. 2, taken at 5000X by scanning electron microscopy.
Figure 6:
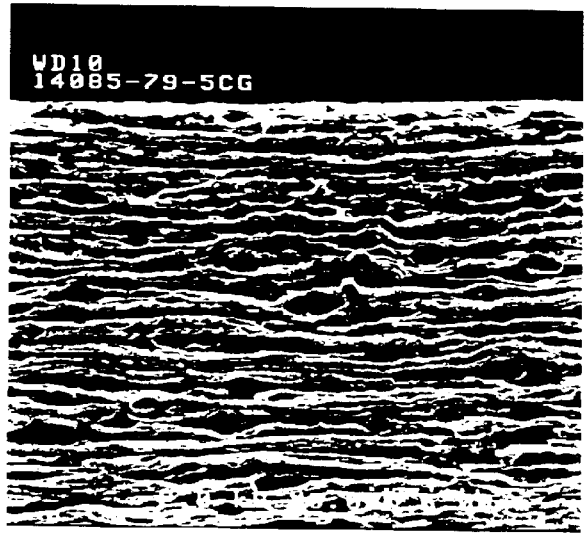
FIG. 6 is a photomicrograph of the cross-section of a molded article shown in the drawing, FIG. 3, taken at 5000X by scanning electron microscopy.

Turning now to the drawings made from representative photomicrographs, presented as FIGS. 1–3. The drawing in FIG. 1 presents a cross section view of the shear zone of a specimen molded from the resin of Example 25, showing the presence of the layered morphology and high aspect ratio particles considered in the art to be desirable for good paint adhesion. In FIG. 2, showing the morphology of Example 21, the layered morphology is well developed, but fewer particles having high aspect ratio are seen. In FIG. 3, showing the morphology of Example 17, the composition exhibits no layering, there are few high aspect ratio gel particles and there is little indication of a surface layer. The corresponding photomicrographs are presented in FIGS. 4–6 for a more detailed comparison.

The morphology characteristics of Examples 16–25, together with composition for each, are summarized in Table 2. The morphology of the molded articles is given a rating, determined by comparing the particle aspect ratio, layering and surface with the morphology of the examples shown in FIGS. 1–3.

Generally, the morphology most desired for good paintability will be that exhibited in Examples 13, 15 and 17, all similar in appearance to the morphology shown in FIG. 1.

to the invention with high and low ethylene content $RCC_2$ demonstrates that both the aspect ratio of the rubber particles and the development of layering is dependent upon the ethylene content of the rubber component. Compare Examples 16–20 comprising a rubber component having a high ethylene content, wherein there is a reduction in the development of layering and the rubber particles have a low aspect ratio, with Examples 21–25 comprising a rubber component with a lower ethylene level, wherein there is well developed layering, and the rubber particles have high aspect ratios.

As with the compositions of Examples 1–16, the stiffness as reflected in Flexural Modulus will be seen to vary directly with rubber content. Increasing the rubber content of the RTPO will provide flexible, low modulus moldings, and with the ethylene content appropriately selected according to the teachings set forth herein the molded articles will have the desired morphology and good paintability.

It will again be seen that both poor and good morphology may be obtained when injection molding compositions at every level of rubber content. Although high rubber levels tend to provide low flexural modulus moldings having improved paintability when higher levels of ethylene are employed, development of the desired layered structure becomes more difficult and leads to erratic molding results. The use of higher levels of rubber also tends to result in a rough surface layer and possibly increased gel content,

TABLE 2

RTPO Composition vs Paintability on Morphology

| Example: | 16 | 17 | 18 | 19 | 20 | 21 | 22 | 23 | 24 | 25 |
|---|---|---|---|---|---|---|---|---|---|---|
| Rubber (wt %) | 17.8 | 29.2 | 18.6 | 30.4 | 22.7 | 22.6 | 28.3 | 17.0 | 17.0 | 29.6 |
| $RCC_2$ (wt %) | 61.5 | 60.9 | 59.8 | 59.8 | 59.7 | 53.4 | 46.0 | 45.7 | 45.7 | 45.1 |
| MFR -- final (g/10 min) | 1.5 | 1.5 | 1.5 | 1.5 | 1.4 | 1.6 | 1.5 | 1.6 | 1.6 | 1.5 |
| MFR -- PP (g/10 min) | 4.8 | 4.7 | 3.0 | 10.3 | 3.5 | 5.3 | 10.7 | 3.2 | 4.9 | 4.8 |
| MFR -- ratio | 480 | 52 | 50 | 619 | 58 | 177 | 1008 | 64 | 490 | 48 |
| Morphology rating | | | | | | | | | | |
| particle aspect ratio | Low | mixed | Low | Low | Low | m. high | m. high | High | m. high | High |
| layering | slight | slight | none | none | slight | layered | layered | layered | layered | layered |
| surface | sl skin | rough, gel | sl skin | rough, gel | rough | skin | skin | skin | sl skin | sl skin |
| Flex Modulus (Kpsi) | 192 | 139 | 185 | 142 | 170 | 158 | 132 | 166 | 170 | 127 |

Melt flow ratio was observed to have little effect on paintability, as shown by Examples 1–15. It will be readily apparent from consideration of Examples 16–25, summarized in Table 2, that change in the melt flow rate ratio also has little effect on morphology. Compare Examples 16–20, where the aspect ratio of the rubber particles remains low over a wide range of MFR ratios, and Examples 21–25, where the aspect ratio is medium high or high, again over a wide range of MFR ratios.

Layering, also described as development of a morphology gradient within the shear layer nearest the part surface, is considered to be an important component of the morphology of paintable formulations. Comparing examples according particularly at high MFR ratios. Compare Example 17 with 18, wherein reducing the rubber content for a composition with high $RCC_2$ lowered the surface roughness and gel formation.

RTPO resins may be tailored to have a desired level of flexural modulus or stiffness. As noted above, reducing rubber content may increase flexural modulus in molded parts. However, selection of the ethylene content of the rubber within a specific range will be necessary to provide acceptable paintability and morphology. In the following Table 3, five examples from Tables 1 and 2 are presented. The resins are particularly rigid for thermoplastic polyolefins, having flexural modulus values at or greater than 120 Kpsi.

TABLE 3

High Flexural Modulus RTPO Resins

| Example | Rubber (wt %) | RCC$_2$ (wt %) | MFR ratio | Morphology particle | Morphology layering | Flex Modulus (Kpsi) |
|---|---|---|---|---|---|---|
| 23 | 17 | 45.7 | 490 | med. high | layered | 170 |
| 24 | 17 | 45.7 | 64 | high. | layered | 166 |
| 21 | 22.6 | 53.4 | 177 | med. high | layered | 158 |
| 22 | 28.3 | 46 | 1008 | med. high | layered | 132 |
| 25 | 29.6 | 45.1 | 48 | high | layered | 127 |
| 15 | 30.8 | 44.2 | 962 | n.d. | n.d. | 121 | n.d. = not determined.

Flexural modulus will be seen to vary directly with rubber content in a rather linear fashion for the RTPO compositions summarized in Table 3. MFR ratio, while having a small effect on modulus as seen by comparing Examples 23 and 24, appears to have little effect on morphology. The composition of Example 15 was not examined for morphology, but the paintability rating for the molded article, shown in Table 1, was "good" (4.0). Paintability for Example 25 was also rated and found to be "good".

RTPO resins according to this invention having a high flexural modulus, greater than about 120 Kpsi, together with good paintability will thus comprise from about 17 to about 30 wt %, preferably from about 20 to about 30 wt %, rubber component dispersed in an isotactic polypropylene matrix based on the total weight of the two components, said rubber component comprising from about 43 to about 54 wt % ethylene. As seen in Table 2, further increases in RCC$_2$ result in poor morphologies, and in Table 1 paintability for examples with high RCC$_2$ levels was particularly bad.

In summary, the invention will thus be seen to be directed to an olefin polymer composition containing a highly isotactic polypropylene matrix having dispersed therein from about 15 to about 40 wt %, preferably from about 20 to about 40 wt % of an ethylene-propylene particulate rubber (based on combined weight of matrix and rubber), said rubber comprising from about 40 to about 70 wt % ethylene, based on combined weight of olefin monomers in the rubber component. The invention may be described more preferably as directed to RTPO resins containing from about 20 to about 35 wt %, still more preferably from about 20 to 30 wt %, rubber component dispersed in a highly isotactic polypropylene matrix, said rubber component comprising an ethylene-propylene copolymer having an ethylene content in the range of from about 40 to about 60 wt %, preferably from about 40 to about 55 wt %, still more preferably from about 43 to about 55 wt % ethylene units exhibit the morphology characteristic of paintable polypropylene resins, and are in fact improved in paintability. Particularly preferred are RTPO resins having a flexural modulus greater than about 100 Kpsi, preferably from about 120 Kpsi to about 180 Kpsi, comprising from about 17 to about 30 wt %, preferably from about 20 to about 30 wt % rubber component dispersed in a highly isotactic polypropylene matrix, said rubber component comprising an ethylene-propylene copolymer having an ethylene content in the range of from about 40 to about 55 wt %, still more preferably from about 43 to about 54 wt % ethylene, based on combined weight of olefin monomers in the rubber component.

Generally the ASTM D1238L melt flow rate, at 230° C., 2.16 Kg load, for the RTPO resin will lie in the range of from about 0.5 to about 30 g/10 min. and the melt flow rate for the homopolypropylene matrix will lie in the range of from about 1 to about 20 g/10 min.

The invention may also be characterized as a method for improving the paintability of TPO resin articles, the invented method comprising providing an article molded from a composition comprising an RTPO resin containing from about 80 to about 65 wt %, more preferably from about 80 to 70 wt % highly isotactic polypropylene matrix having dispersed therein from about 20 to about 35 wt %, more preferably from about 20 to 30 wt % rubber component, based on combined weight of matrix and rubber, said rubber component comprising an ethylene-propylene copolymer having an ethylene content in the range of from about 40 to about 60 wt %, preferably from about 40 to about 55 wt %, still more preferably from about 43 to about 54 wt % ethylene units, based on combined weight of olefin monomers in the rubber component.

Although the invention is described herein and illustrated by way of specific embodiments, employing RTPO resins produced by a particular polymerization process, the various embodiments are provided by way of illustration and are not intended to be limiting. Those skilled in the art will recognize that RTPO resins based on an isotactic polypropylene containing a dispersed phase comprising alternative olefin monomer copolymers within the general description of the invention are available or may be readily produced and used in providing molded articles with improved paintability. Still further modifications and variations will be readily apparent to those skilled in the resin formulating and fabricating art, and such variations and modifications will be understood to lie within the scope of the invention as defined by the appended claims.

We claim:

1. A reactor olefin polymer composition comprising from about 85 to about 60 wt % isotactic polypropylene as a continuous phase and from about 15 to about 40 wt % of an ethylene-containing polymer consisting essentially of an ethylene-propylene copolymer rubber as a discontinuous phase, said ethylene-propylene copolymer containing from about 40 to about 60 wt % ethylene units, based on combined weight of olefin monomers in said copolymer.

2. The olefin polymer composition of claim 1 wherein said composition has an ASTM D1238L melt flow rate of from about 0.5 to about 30 g/10 min. at 230° C., 2.16 Kg load and wherein said isotactic homopolypropylene has a melt flow rate of from about 1 to about 20 g/10 min. at 230° C., 2.16 Kg load.

3. The olefin polymer composition of claim 1 comprising from about 80 to about 65 wt % isotactic homopolypropylene and from about 20 to about 35 wt % ethylene-propylene copolymer.

4. The olefin polymer composition of claim 1 wherein said ethylene propylene copolymer comprises from about 40 to about 55 wt % ethylene units.

5. The olefin polymer composition of claim 1 wherein said ethylene propylene copolymer comprises from about 43 to about 54 wt % ethylene units.

6. The olefin polymer composition of claim 1 wherein said reactor olefin polymer composition is an in-reactor thermoplastic olefin prepared by sequential polymerization.

7. The olefin polymer of claim 6 wherein the polymerization is a gas phase copolymerization.

8. The olefin polymer composition of claim 1 wherein said polymer is substantially free of gel.

9. The olefin polymer composition of claim 1 wherein said homopolypropylene is greater than about 90% isotactic.

10. A reactor olefin polymer composition having a flexural modulus, determined according to ASTM D790 at 0.5 in/min., of from about 100 Kpsi to about 180 Kpsi, said composition comprising from about 83 to about 70 wt % isotactic polypropylene as a continuous phase and from about 17 to about 30 wt % of an ethylene-containing polymer consisting essentially of an ethylene-propylene copolymer rubber as a discontinuous phase, said ethylene-propylene copolymer containing from about 40 to about 55 wt % ethylene units, based on combined weight of olefin monomers in said copolymer.

11. The olefin polymer composition of claim 10 comprising from about 80 to about 70 wt % isotactic homopolypropylene and from about 20 to about 30 wt % ethylene-propylene copolymer.

12. The olefin polymer composition of claim 10 wherein said ethylene propylene copolymer comprises from about 43 to about 54 wt % ethylene units.

13. The olefin polymer composition of claim 10 wherein said polymer is an in-reactor thermoplastic olefin prepared in a sequential polymerization process.

14. The olefin polymer of claim 13 wherein the polymer is a copolymer prepared in a sequential gas-phase polymerization process.

15. An injection-molded article comprising from about 80 to about 60 wt % isotactic polypropylene as a continuous phase and from about 20 to about 40 wt % ethylene-propylene copolymer as a discontinuous phase, said ethylene-propylene copolymer containing from about 40 to about 60 wt % ethylene units, based on combined weight of olefin monomers in said copolymer.

16. The injection molded article claim 15 having a paint film adhered to at least one surface thereof.

17. The injection molded article of claim 15 comprising from about 83 to about 70 wt % isotactic polypropylene as a continuous phase and from about 17 to about 30 wt % ethylene-propylene copolymer as a discontinuous phase, said ethylene-propylene copolymer containing from about 40 to about 55 wt % ethylene units, based on combined weight of olefin monomers in said copolymer.

18. A method for providing a paintable polypropylene article comprising the steps of (a) providing an injection-moldable reactor polymer composition comprising from about 85 to about 60 wt % isotactic polypropylene as a continuous phase and from about 15 to about 40 wt % of an ethylene-containing polymer consisting essentially of an ethylene-propylene copolymer rubber as a discontinuous phase, said ethylene-propylene copolymer containing from about 40 to about 60 wt % ethylene units, based on combined weight of olefin monomers in said copolymer and (b) injection molding said olefin polymer composition.

19. The method of claim 18 wherein said composition comprises from about 83 to about 70 wt % isotactic polypropylene as a continuous phase and from about 17 to about 30 wt % ethylene-propylene copolymer as a discontinuous phase, said ethylene-propylene copolymer containing from about 40 to about 55 wt % ethylene units, based on combined weight of olefin monomers in said copolymer.

20. The method of claim 18 wherein the injection molded polymer composition is treated with a chlorinated polyethylene adhesion promoter prior to painting.

* * * * *

UNITED STATES PATENT AND TRADEMARK OFFICE
CERTIFICATE OF CORRECTION

PATENT NO. : 6,284,833 B1  Page 1 of 1
DATED : September 4, 2001
INVENTOR(S) : Aaron K. Ford, William J. Kissel, Chi-Hung Lin, Helene G. Lollis, Constantine Metaxas, Mary K. Trost It is certified that error appears in the above-identified patent and that said Letters Patent is hereby corrected as shown below:

Column 8,
Line 19, "as low as 0.5 gl/10 min.," should read -- as low as 0.5 g/10 min., --

Column 11,
Line 24, "according to tion," should read -- according to the invention,"
Line 57, "14    30.8    44.2    1.8" should read -- 15    30.8    44.2    1.8 --

Column 13,
Line 37, "Paintability on Morphology" should read
-- Paintability; Effect on Morphology --

Signed and Sealed this

Twelfth Day of March, 2002

Attest:

JAMES E. ROGAN
*Attesting Officer*    *Director of the United States Patent and Trademark Office*